United States Patent
Busch

(10) Patent No.: US 7,000,848 B2
(45) Date of Patent: Feb. 21, 2006

(54) CIRCUIT CONFIGURATION FOR FAN REGULATION

(75) Inventor: Peter Busch, Augsburg (DE)

(73) Assignee: Fujitsu Siemens Computers GmbH, Munich (DE)

(*) Notice: Subject to any disclaimer, the term of this patent is extended or adjusted under 35 U.S.C. 154(b) by 159 days.

(21) Appl. No.: 10/768,457

(22) Filed: Jan. 30, 2004

(65) Prior Publication Data

US 2004/0184910 A1    Sep. 23, 2004

(30) Foreign Application Priority Data

Feb. 24, 2003   (DE)   ................................ 103 07 823

(51) Int. Cl.
*F24F 7/00*    (2006.01)
*H03K 5/153*   (2006.01)
*G05B 1/02*    (2006.01)
*F01B 25/00*   (2006.01)

(52) U.S. Cl. .................... 236/49.3; 327/77; 327/74; 318/608; 415/13

(58) Field of Classification Search ............... 236/49.3; 318/671, 738, 503, 608; 327/77, 74; 415/13

See application file for complete search history.

(56) References Cited

U.S. PATENT DOCUMENTS

| 4,721,865 A | 1/1988 | Tallaron et al. |
| 6,274,991 B1 | 8/2001 | Busch |
| 6,285,146 B1 * | 9/2001 | Harlan ........................ 318/254 |

FOREIGN PATENT DOCUMENTS

DE    198 07 253 C1    9/1999

* cited by examiner

*Primary Examiner*—Chen Wen Jiang
(74) *Attorney, Agent, or Firm*—Laurence A. Greenberg; Werner H. Stemer; Ralph E. Locher

(57) ABSTRACT

A fan regulation circuit configuration includes an input receiving an input voltage (proportional to fan current and forms a first comparison voltage), a low-pass filter (filters input voltage and a filter output voltage is tapped off as second comparison voltage), a first comparison device for commutation identification (outputs signal indicating a commutation if value of one of the comparison voltages multiplied by first factor is greater than the other comparison voltage), and a regulator (outputs a control voltage dependent upon identified commutation pulses). The circuit has self-adjusting sensitivity adaptation and a second comparison device outputting a signal if the value of one of the comparison voltages multiplied by a second factor is greater than the other comparison voltage, the second factor being less than the first factor. A control device decreases the first and second factors in the event of an output signal of the second comparison device being received to reduce the sensitivity of the commutation identification.

15 Claims, 2 Drawing Sheets

CIRCUIT CONFIGURATION FOR FAN REGULATION

BACKGROUND OF THE INVENTION

FIELD OF THE INVENTION

The invention relates to a circuit configuration for fan regulation. The configuration has an input for receiving an input voltage, which is proportional to a fan current and forms a first comparison voltage, a low-pass filter, which filters the input voltage and at the output of which a filter output voltage can be tapped off as second comparison voltage, a first comparison device for commutation identification, which outputs at its output a signal indicating a commutation if the value of one of the comparison voltages multiplied by a first factor is greater than the other comparison voltage, and a regulator, which outputs a fan control voltage in a manner dependent on identified commutation pulses.

Such a circuit configuration is suitable for the identification of commutation pulses and for fan regulation in a manner dependent on the identified commutation pulses. Positive or negative commutation pulses are identified depending on which comparator voltage is multiplied by the factor.

Such circuit configurations for fan regulation are used because switched-mode power supplies of relatively high power require electronically commutated fans to cool them. For monitoring purposes and for regulating purposes, the rotational speed has to be detected electronically.

It has been known hitherto to use special fans that pass an internal clock signal of the electronic commutation toward the outside through an additional line so that an external fan regulation can access the signal. However, such special fans are comparatively expensive.

Moreover, it is known to use standard fans and to identify the commutations by detection of the current fluctuations of the fan by a current measuring resistor, connected in series with the fan, and coupling out of the current fluctuations through a high-pass filter or by differentiation and subsequent pulse shaping. The commutation operation can be identified from the fact that the current changes greatly in a very short time at this point in time. The rate of change is at least a factor of 10 higher than the rate of change of the current brought about by the counter-EMF of the motor. These commutation pulses have hitherto been coupled out by removing their DC component and suitably shaping, from the remaining AC component, the components with a high rate of change to form pulses. Methods that operate with the aid of a capacitor and also methods that operate on a digital basis using digital/analog converters are known in this case. Such a circuit and such a method are disclosed for example in U.S. Pat. No. 4,721,865 to Tallaron. Both the analog and the digital circuit configurations for fan regulation and for the identification of commutation pulses are coordinated with a specific type of fan because the height and slope of the commutation pulses depend greatly on the type of fan used. However, the known circuit configurations do not function satisfactorily if one wishes to use an existing circuit configuration for fan regulation to operate different types of fan or makes of fan without changing settings.

To be able to monitor different types of fan with a different operating current, it is possible to detect the maximum rate of change of the fan current and to use a specific percentage thereof as a switching threshold for the identification of a commutation. However, such a procedure has a serious disadvantage. If the fan blocks, the blocking must be able to be identified by a connected monitoring unit. It is necessary to avoid the situation in which voltage or current fluctuations are incorrectly identified as fan commutation pulses if the fan is not rotating.

If commutation no longer takes place due to blocking of the fan, the operating current will normally no longer fluctuate and the AC component tends toward zero. Therefore, the switching threshold for the identification of a commutation pulse falls to a minimum value. If the operating voltage of the blocked fan then fluctuates without the fan rotating, the current of the blocked fan also fluctuates because it exhibits ohmic behavior in the event of blocking. As a result, the commutation identification incorrectly identifies pulses even though the fan is blocked. As a result, a blocked fan cannot be reliably identified. A fluctuation of the operating voltage will occur whenever other loads on the same power supply unit generate sudden load changes, e.g., hard disks or processors with an activated power saving function.

SUMMARY OF THE INVENTION

It is accordingly an object of the invention to provide a circuit configuration for fan regulation or control that overcomes the hereinafore-mentioned disadvantages of the heretofore-known devices of this general type and that reliably identifies commutation pulses and, at the same time, can also be used with different types of fans without changing settings.

With the foregoing and other objects in view, there is provided, in accordance with the invention, a circuit configuration for fan regulation, including an input for receiving an input voltage, proportional to a fan current and forming a first comparison voltage, a low-pass filter connected to the input and filtering the input voltage, the filter having an output at which a filter output voltage is tapped off as a second comparison voltage, a first comparison device connected to the input and to the filter for commutation identification and having an output at which a signal indicates a commutation if a value of one of the first and second comparison voltages multiplied by a first factor is greater than the other one of the first and second comparison voltages, a regulator connected to a fan and outputting a fan control voltage in a manner dependent upon identified commutation pulses, a second comparison device connected to the input and to the filter and having an output at which is provided an output signal if a value of one of the first and second comparison voltages multiplied by a second factor is greater than the other one of the first and second comparison voltages, the second factor being less than the first factor, and a control device connected to the outputs of the first and second comparison devices, the control device decreasing the first and second factors in the event of receiving the output signal of the second comparison device for reducing a sensitivity of the commutation identification.

The circuit configuration includes a second comparison device that indicates at its output with an output signal if the value of one of the comparison voltages multiplied by a second factor is greater than the other comparison voltage, the second factor being less than the first factor, and includes a control device by which the first and second factors can be decreased in the event of an output signal of the second comparison device being received, in order to reduce the sensitivity of the commutation identification.

A self-adjusting evaluation of current ratios is realized by the characterizing features of the circuit configurations according to the invention. The input signal that, for example, comes from a current measuring resistor and is amplified is passed to a low-pass filter having a large transconductance. The limiting frequency is set such that the low-frequency fan current component caused by the counter-EMF can pass with no appreciable change, while the higher-frequency fan current component resulting from the internal changeover of the fan drive coil, that is to say, the commutation, is suppressed. As such, the first comparison device can identify whether or not a commutation pulse is present from the difference between the unfiltered input voltage and the filter output voltage. Because the magnitude of the voltages fluctuates depending on the operating situation and the fan used, the ratio of the voltages is evaluated.

An adaptation to different types of fan is made possible by virtue of the fact that one of the two comparison voltages is multiplied by a first factor, which is variable. The measures used for this purpose may be a voltage divider. The self-adjustment of the sensitivity is realized by providing the second comparison device, which evaluates the comparison voltage multiplied by a second factor. It is, thus, identified if the voltage of a commutation pulse is particularly high. The output signal of the second comparison device is used to reduce the sensitivity of the commutation identification.

A development of the invention may provide for preventing the factors, i.e., the sensitivity, from being continually switched up and down, in that a third comparison device is provided, at the input of which the comparison voltage multiplied by a third factor is present, the third factor lying between the first and second factors. When an output signal of the third comparison device is present, a decrease of the first and second factors by the control device is delayed and is effected only when an output signal of the second comparator is present again at the point in time of an expected subsequent commutation pulse.

In accordance with another feature of the invention, there is provided a voltage divider having a tap and multiplication of one of the first and second comparison voltages by at least one of the first and second factors is effected by the tap.

In accordance with a further feature of the invention, the voltage divider has first and second taps and multiplication by the first factor is effected by the first tap and multiplication by the second factor is effected by the second tap.

In accordance with an added feature of the invention, there are provided resistors setting a divider ratio at the first and second taps of the voltage divider by being switched above the first tap.

In accordance with an additional feature of the invention, there is provided a third comparison device connected to the input and to the filter and having an output at which is provided an output signal if a value of one of the first and second comparison voltages multiplied by a third factor is greater than the other one of the first and second comparison voltages, the third factor being less than the first factor and greater than the second factor and the control device delays the decrease of the first and second factors and effects the decrease only when an output signal of the second comparator is present again at a point in time of an expected subsequent commutation pulse.

In accordance with yet another feature of the invention, the voltage divider has first and second taps and a third tap between the first and second taps, resistors set a divider ratio at the first and second taps of the voltage divider by being switched above the first tap, and multiplication by the first factor is effected by the first tap, multiplication by the second factor is effected by the second tap, and multiplication by the third factor is effected by the third tap.

In accordance with yet a further feature of the invention, the filter has a settable filter frequency and a filter frequency setting device is connected to the filter and sets the filter frequency dependent upon a rotational speed of a connected fan.

In accordance with yet an added feature of the invention, there is provided a clock generator connected to the regulator, the control device, and the filter and supplying the regulator, the control device, and the filter with clock signals having frequencies in a fixed ratio with respect to one another.

In accordance with yet an additional feature of the invention, to identify positive commutation pulses, the input voltage is the one of the comparison voltages multiplied by the first and second factors and the other one of the comparison voltages is the filter output voltage.

In accordance with again another feature of the invention, to identify negative commutation pulses, the filter output voltage is the one of the comparison voltages multiplied by the first and second factors, and the other one of the comparison voltages is the input voltage.

In accordance with again a further feature of the invention, there is provided a voltage divider having a tap, the voltage divider multiplying one of the first and second comparison voltages by at least one of the first and second factors with the tap.

In accordance with again an added feature of the invention, the voltage divider has first and second taps and the voltage divider multiplies by the first factor with the first tap and multiplies by the second factor with the second tap.

In accordance with again an additional feature of the invention, the voltage divider has resistors with the taps and a switch is connected to the control device and selectively connects at least one of the first and second comparators to set a divider ratio of the voltage divider by switching at least one of the resistors at the first tap.

With the objects of the invention in view, there is also provided a circuit configuration for identifying positive and negative commutation pulses, including an input for receiving an input voltage, proportional to a current and forming a first comparison voltage, a low-pass filter connected to the input and filtering the input voltage, the filter having an output at which a filter output voltage is tapped off as a second comparison voltage, a first comparison device connected to the input and to the filter for commutation identification and having an output at which a signal indicates a commutation if a value of one of the first and second comparison voltages multiplied by a first factor is greater than the other one of the first and second comparison voltages, a regulator outputting a control voltage in a manner dependent upon identified commutation pulses, a second comparison device connected to the input and to the filter and having an output at which is provided an output signal if a value of one of the first and second comparison voltages multiplied by a second factor is greater than the other one of the first and second comparison voltages, the second factor being less than the first factor, a control device connected to the outputs of the first and second comparison devices, the control device decreasing the first and second factors in the event of receiving the output signal of the second comparison device for reducing a sensitivity of the commutation identification, to identify positive commutation pulses, the input voltage is the one of the comparison voltages multiplied by the first and second factors and the other one of the comparison voltages is the filter output voltage, and to identify negative commutation pulses, the filter output voltage is the one of the comparison voltages multiplied by the first and second factors, and the other one of the comparison voltages is the input voltage.

Other features that are considered as characteristic for the invention are set forth in the appended claims.

Although the invention is illustrated and described herein as embodied in a circuit configuration for fan regulation, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Both positive and negative commutation pulses, called spikes hereinafter, are evaluated in the first exemplary embodiment in accordance with FIG. 1.

Figure 1:
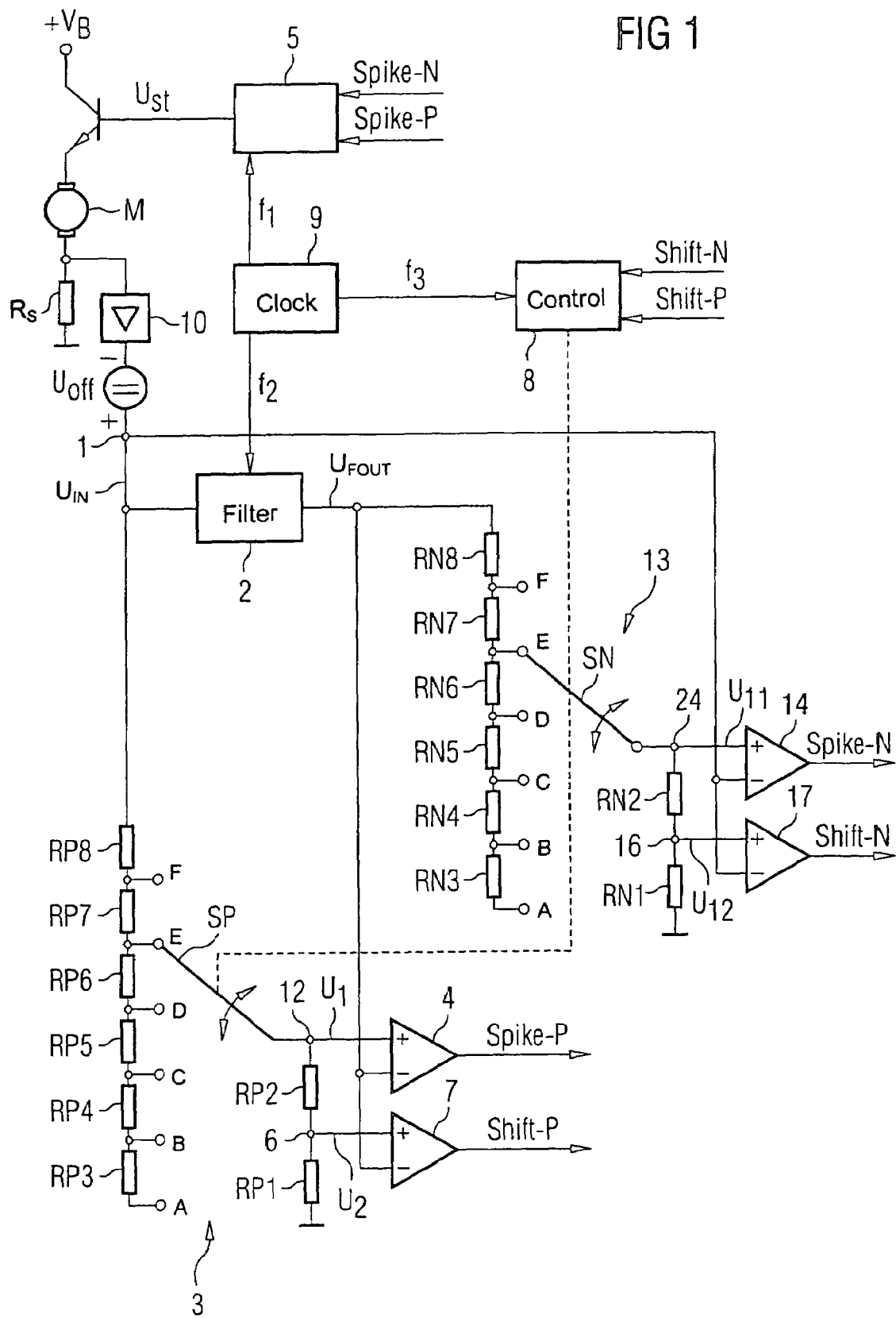
FIG. 1 is a schematic and block circuit diagram of a first exemplary embodiment of a circuit configuration according to the invention.

Referring now to the figures of the drawings in detail and first, particularly to FIG. 1 thereof, there is shown the input signal that comes from a current measuring resistor Rs and is amplified is filtered by a low-pass filter 2 having a large transconductance. The limiting frequency must be set such that the low-frequency fan current component caused by the counter-EMF can pass with no appreciable change, while the higher-frequency fan current component resulting from the internal changeover of the fan drive coil (commutation pulses) is suppressed.

In order, on one hand, to be able to operate different types of fans and makes of fans without changing settings, but, on the other hand, to no longer trigger incorrect pulses in the event of operating voltage jumps and a blocked fan, the filter 2 must be dimensioned very precisely. In the event of changes in rotational speed, the filter limiting frequency is also tracked in this exemplary embodiment and, therefore, a "switched capacitor filter" should be used for the filter 2. A clock generator 9, which prescribes the rotational speed of a fan M through a frequency divider, can control the filter 2 by another, suitably adapted frequency divider. A regulator 5 is connected to the fan and outputs a fan control voltage $U_{st}$ in a manner dependent upon identified commutation pulses.

To detect fans M both with positive and with negative commutation pulses in the rotational speed, the circuit configuration is split into two equally authorized parts, a circuit part for positive spikes and a circuit part for negative spikes.

The region for positive spikes operates as set forth in the following text.

From the instantaneous input voltage $U_{IN}$, that is to say, the voltage that represents the present fan current, a first voltage U1 is formed by a switchable chain of series resistors RP8 . . . RP3, which are part of a voltage divider 3, at a first tap 12 and passed to a first comparator 4. A second voltage U2 is formed at a second tap 6 and passed to a second comparator 7.

For the following explanation, it shall be assumed by way of example that the voltage divider resistances RP1 and RP2=2*R and the values RP3 to RP8 are all equal to R. Furthermore, it shall be assumed that the changeover switch SP is at its topmost position, that is to say connects RP8 to RP2.

The comparator 4, therefore, compares the instantaneous input voltage $U_{IN}$ multiplied by a factor x=4R/5R with the filter output voltage $U_{FOUT}$. If this component of the input voltage $U_{IN}$ exceeds the present filter output voltage $U_{FOUT}$, the comparator 4 will report a commutation pulse at the output with a signal spike-P. In other words, this means that any instantaneous value of the input voltage $U_{IN}$ that exceeds 5/4=125% of the filter output voltage $U_{FOUT}$ is reported as commutation. However, many fans have significantly higher spike percentages, but, at the same time, also relatively high and rapid counter-EMF percentages, which might possibly reach 125%. Therefore, the percentage starting from which an instantaneous value deviation of the input voltage $U_{IN}$ from the filter output voltage $U_{FOUT}$ is reported as commutation must be adapted to the highest spike value presently occurring.

Such adaptation is performed by the second comparator 7. The second comparator 7 compares the instantaneous input voltage $U_{IN}$ multiplied by a second, smaller factor, e.g., y=2R/5R, with the filter output voltage $U_{FOUT}$ If this component of the input voltage $U_{IN}$ exceeds the present filter output voltage $U_{FOUT}$, the comparator 7 will output a signal shift-P, which, through the control device 8, moves the position of the switch SP downward by one position. In other words, this means that any instantaneous value of the input voltage $U_{IN}$ that exceeds y=5/2=250% of the filter output voltage $U_{FOUT}$ will switch the switch SP from the sixth position to the fifth position. Therefore, the new comparison values of the two comparators 4 and 7 are set as set forth in the following text.

The first comparator 4, now, compares the instantaneous input voltage multiplied by a factor x=4R/6R with the filter output voltage $U_{FOUT}$. This means that any instantaneous value of the input voltage $U_{IN}$ that exceeds 6/4=150% of the filter output voltage $U_{FOUT}$ is reported as commutation.

The second comparator 7, now, compares the instantaneous input voltage $U_{IN}$ multiplied by a factor y=2R/6R with the filter output voltage. This means that any instantaneous input voltage that exceeds 6/2=300% of the filter output voltage will switch the switch SP from the fifth position to the fourth position.

The further switching stages behave correspondingly as set forth in the subsequent text.

In the fourth switch stage, the first comparator 4 compares the instantaneous input voltage $U_{IN}$ multiplied by a factor (=4R/7R) with the filter output voltage $U_{FOUT}$. This means that any instantaneous input voltage $U_{IN}$ that exceeds 7/4=175% of the filter output voltage $U_{FOUT}$ is reported as commutation. The second comparator 7 compares the instantaneous input voltage $U_{IN}$ multiplied by a factor y=2R/7R with the filter output voltage $U_{FOUT}$. This means that any instantaneous input voltage $U_{IN}$ that exceeds 7/2=350% of the filter output voltage $U_{FOUT}$ will switch the switch SP from the fourth position to the third position.

In the third switch stage, the first comparator 4 compares the instantaneous input voltage $U_{IN}$ multiplied by a factor x=4R/8R with the filter output voltage $U_{FOUT}$. This means that any instantaneous input voltage $U_{IN}$ that exceeds $9/4=200\%$ of the filter output voltage $U_{FOUT}$ is reported as commutation. The second comparator 7 compares the instantaneous input voltage $U_{IN}$ multiplied by a factor $y=2R/8R$ with the filter output voltage $U_{FOUT}$. This means that any instantaneous input voltage $U_{IN}$ that exceeds $8/2=400\%$ of the filter output voltage $U_{FOUT}$ will switch the switch SP from the third position to the second position.

In the second switch stage, the first comparator 4 compares the instantaneous input voltage $U_{IN}$ multiplied by a factor $x=4R/9R$ with the filter output $U_{FOUT}$. This means that any instantaneous input voltage $U_{IN}$ that exceeds $9/4=225\%$ of the filter output voltage $U_{FOUT}$ is reported as commutation. The second comparator 7 compares the instantaneous input voltage $U_{IN}$ multiplied by a factor $y=2R/8R$ with the filter output voltage $U_{FOUT}$. This means that any instantaneous input voltage $U_{IN}$ that exceeds $9/2=450\%$ of the filter output voltage $U_{FOUT}$ will switch the switch SP from the second position to the first position.

In the first switch stage, the first comparator 4 compares the instantaneous input voltage $U_{IN}$ multiplied by a factor $x=4R/10R$ with the filter output voltage $U_{FOUT}$. This means that any instantaneous input voltage $U_{IN}$ that exceeds $10/4=250\%$ of the filter output voltage $U_{FOUT}$ is reported as commutation.

The region for negative spikes is constructed virtually identically and operates as set forth in the following text. From the instantaneous filter output voltage $U_{FOUT}$, that is to say, the voltage that represents the filtered fan current, a first voltage U11 is formed by a switchable chain of series resistors RN8 ... RN3, which are part of a voltage divider 3, at a first tap 24 and passed to a first comparator 14. A second voltage U12 is formed at a second tap 16 and passed to a second comparator 17.

For the following explanation, it shall be assumed by way of example that the values RN1 and RN2=2*R and the values RN3 to RN8 are all equal to R.

Furthermore, it shall be assumed that the changeover switch SN is at its topmost position, that is to say, connects RN8 to RN2.

Therefore, the first comparator 14 compares the instantaneous filter output voltage $U_{FOUT}$ multiplied by a factor $x=4R/5R$ with the input voltage $U_{IN}$. If this component of the filter output voltage $U_{FOUT}$ exceeds the present instantaneous value of the input voltage $U_{IN}$, the first comparator 14 will report a commutation pulse at the output with a signal spike-N. In other words, this means that any instantaneous input voltage $U_{IN}$ that assumes a value of less than $4/5=80\%$ of the filter output voltage $U_{FOUT}$ is reported as commutation.

An automatic adaptation to the type of fan used is also necessary in the case of negative spikes. Such adaptation is performed by the second comparator 17. The second comparator 17 compares the instantaneous filter output voltage $U_{FOUT}$ multiplied by a second, lower factor, e.g., $y=2R/5R$, with the instantaneous value of the input voltage $U_{IN}$. If this component of the filter output voltage $U_{FOUT}$ exceeds the present instantaneous value of the input voltage $U_{IN}$, the second comparator 17 will output a signal shift-N, which, through the control device 8, moves the position of the switch SN downward by one position. In other words, this means that any instantaneous input voltage $U_{IN}$ that assumes a value of less than $2/5=40\%$ of the filter output voltage $U_{FOUT}$ will switch the switch SN from the sixth position to the fifth position. Therefore, the new comparison values of the two comparators 14 and 17 are set as set forth in the following text.

The first comparator 14, now, compares the instantaneous filter output voltage $U_{FOUT}$ multiplied by a factor $x=4R/6R$ with the instantaneous value of the input voltage $U_{IN}$. This means that any instantaneous input voltage $U_{IN}$ that assumes a value of less than $4/6=67\%$ of the filter output voltage $U_{FOUT}$ is reported as commutation. The second comparator 17 now compares the instantaneous filter output voltage $U_{FOUT}$ multiplied by a factor $y=2R/6R$ with the instantaneous value of the input voltage $U_{IN}$. This means that any instantaneous input voltage $U_{IN}$ that assumes a value of less than $2/6=33\%$ of the filter output voltage $U_{FOUT}$ will switch the switch SN from the fifth position to the fourth position.

The further switching stages behave correspondingly as set forth in the subsequent text.

In the fourth switch stage, the first comparator 14 compares the instantaneous filter output voltage $U_{FOUT}$ multiplied by a factor $x=4R/7R$ with the instantaneous value of the input voltage $U_{IN}$. This means that any instantaneous input voltage $U_{IN}$ that falls below $4/7=57\%$ of filter output voltage $U_{FOUT}$ is reported as commutation. The second comparator 17 compares the instantaneous filter output voltage $U_{FOUT}$ multiplied by a factor $y=2R/7R$ with the instantaneous value of the input voltage $U_{IN}$. This means that any instantaneous input voltage $U_{IN}$ that falls below $2/7=28\%$ of the filter output voltage $U_{FOUT}$ will switch the switch SN from the fourth position to the third position.

In the third switch stage, the first comparator 14 compares the instantaneous filter output voltage $U_{FOUT}$ multiplied by a factor $x=4R/8R$ with the instantaneous value of the input voltage $U_{IN}$. This means that any instantaneous input voltage $U_{IN}$ that falls below $4/8=50\%$ of the filter output voltage $U_{FOUT}$ is reported as commutation. The second comparator 17 compares the instantaneous filter output voltage $U_{FOUT}$ multiplied by a factor $y=2R/8R$ with the instantaneous value. This means that any instantaneous input voltage $U_{IN}$ that falls below $2/8=25\%$ of the filter output voltage $U_{FOUT}$ will switch the switch SN from the third position to the second position.

In the second switch stage, the first comparator 14 compares the instantaneous filter output voltage $U_{FOUT}$ multiplied by a factor $x=4R/9R$ with the instantaneous value of the input voltage $U_{IN}$. This means that any instantaneous input voltage $U_{IN}$ that falls below $4/9=44\%$ of the filter output voltage $U_{FOUT}$ is reported as commutation. The second comparator 17 compares the instantaneous filter output voltage $U_{FOUT}$ multiplied by a factor $y=2R/8R$ with the instantaneous value of the input voltage $U_{IN}$. This means that any instantaneous input voltage $U_{IN}$ that falls below $2/9=22\%$ of the filter output voltage $U_{FOUT}$ will switch the switch SN from the second position to the first position.

In the first switch stage, the comparator 14 compares the instantaneous filter output voltage $U_{FOUT}$ multiplied by a factor $x=4R/10R$ with the instantaneous value of the input voltage $U_{IN}$. This means that any instantaneous input voltage $U_{IN}$ that falls below $4/10=40\%$ of the filter output voltage $U_{FOUT}$ is reported as commutation.

The outputs of the comparators 4 and 14 are ORed in order to detect both positive and negative fan pulses.

The signals shift-N and shift-P are ORed and are passed as input signal to the control device 8. Upon each switching pulse shift-P or shift-N, the control device 8 switches the switches SP and SN down by one position. The two switches are switched up by a clock frequency f3. If no renewed switching pulse spike-P or spike-N of the comparators 4 or 14 has arrived after a number of f3 clock pulses that corresponds to the time of, e.g., two revolutions of the fan M, the control device 8 switches up by one position and, thus, increases the sensitivity of the circuit again.

Therefore, in steady-state operation, the control device 8 will change back and forth between two switch positions if the instantaneous value amplitude repeatedly exceeds the threshold for the identification of positive or negative spikes.

Figure 2:
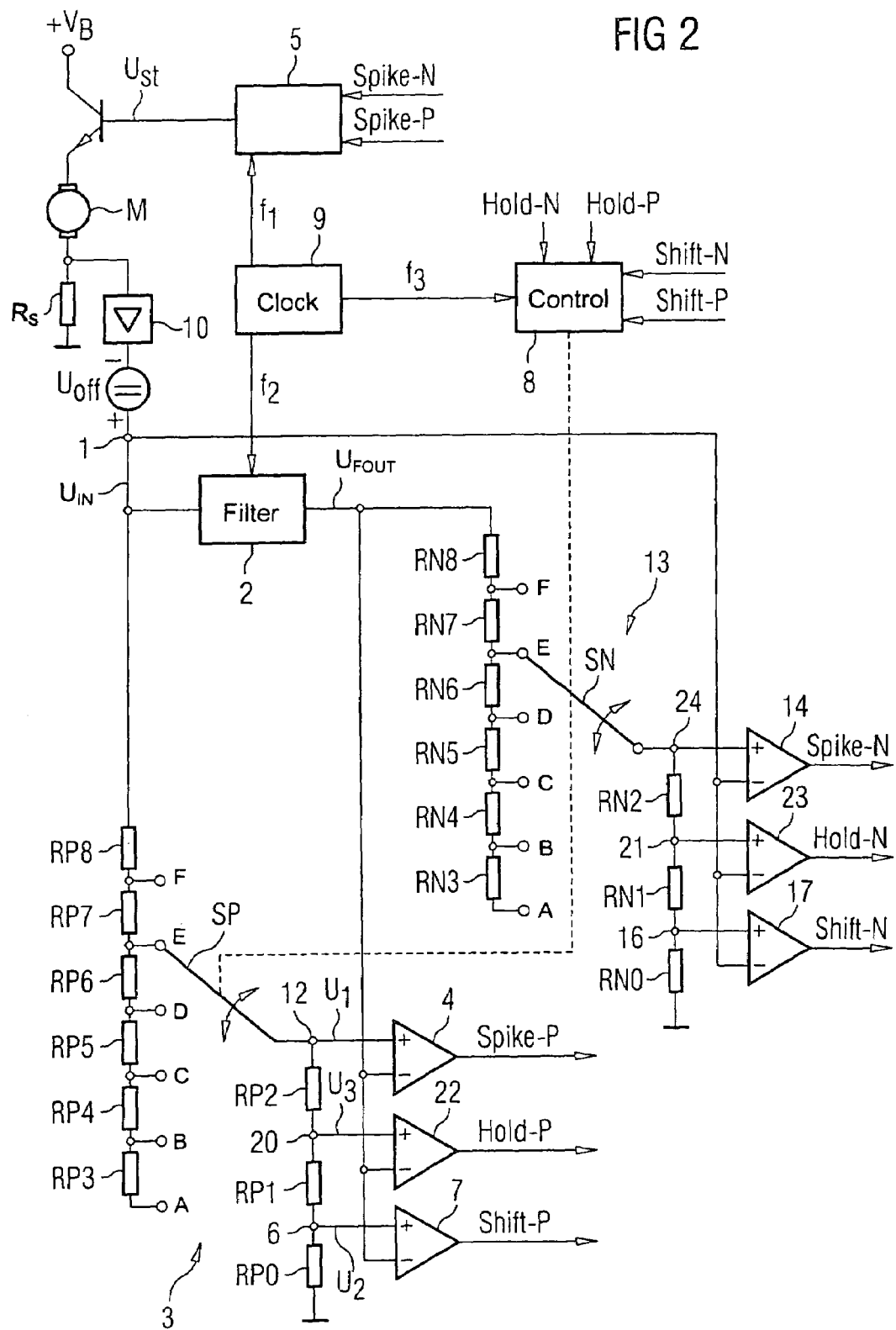
FIG. 2 is a schematic and block circuit diagram of a second exemplary embodiment of a circuit configuration according to the invention.

In a second, developed exemplary embodiment in accordance with FIG. 2, the "changing back and forth" of the switch positions can be prevented by a respective further comparator 22 and 23, called hold comparator, being inserted between the comparators 4 and 7 and 14 and 17, respectively, and being connected to an additional tap 20 and 21, respectively, of the respective voltage divider. The hold comparators 22 and 23, thus, have a switching threshold between the comparators 4 and 7, and 14 and 17, respectively. Their task is to reset an internal counter of the f3 pulses, which is situated in the control device 8, upon each identified pulse. There are, thus, three conditions for the switch position of SP and SN, as set forth in the subsequent text.

If a pulse reaches the switching threshold of a shift comparator 7 or 17 responsible for the changeover, the control device 8 switches downward by one switch position, that is to say, the commutation identification becomes less sensitive. If the level of a pulse lies below the switching threshold of a shift comparator but above the switching threshold of the hold comparator, the control device 8 resets the internal counter for switching upward and waits again for approximately two revolutions until it would set the switch position upward.

If the level of a pulse lies below the switching threshold of the respective hold comparator but above the switching threshold of the spike comparator, the control device 8 waits for approximately two revolutions of the fan, and if no signal has arrived from the hold comparators 22 and 23 by then, it sets the switch position upward by one stage.

The two switches SN and SP always have the same switch position to ensure that a fan M with high negative spikes does not react to small erroneous positive spikes, which could perfectly well happen in the event of an independent switch position.

The lowest voltage for the input voltage $U_{IN}$ must be greater than zero, e.g., 100 mV, because, at a voltage of 0 mV, the comparators would compare 0 with 0, which would bring about incorrect output signals. Therefore, an offset voltage $U_{OFF}$ is added to the detected voltage across the measuring resistor $R_s$, the voltage possibly being amplified by an amplifier 10.

If, in the case of a maximum permitted operating voltage fluctuation of +/−5%, the lowest current switching threshold is set to, e.g., +/−25% or more, an incorrect pulse can no longer be triggered in the event of operating voltage jumps and a blocked fan because the current fluctuations generated by the operating voltage fluctuations will lie below 25%.

Such identification no longer depends on the absolute value of the fan supply current, that is to say, is suitable for all fan sizes without adaptation.

I claim:

1. A circuit configuration for fan regulation, comprising:
an input for receiving an input voltage, proportional to a fan current and forming a first comparison voltage;
a low-pass filter connected to said input and filtering the input voltage, said filter having an output at which a filter output voltage is tapped off as a second comparison voltage;
a first comparison device connected to said input and to said filter for commutation identification and having an output at which a signal indicates a commutation if a value of one of said first and second comparison voltages multiplied by a first factor is greater than the other one of said first and second comparison voltages;
a regulator connected to a fan and outputting a fan control voltage in a manner dependent upon identified commutation pulses;
a second comparison device connected to said input and to said filter and having an output at which is provided an output signal if a value of one of said first and second comparison voltages multiplied by a second factor is greater than the other one of said first and second comparison voltages, said second factor being less than said first factor; and
a control device connected to said outputs of said first and second comparison devices, said control device decreasing said first and second factors in the event of receiving said output signal of said second comparison device for reducing a sensitivity of the commutation identification.

2. The circuit configuration according to claim 1, further comprising:
a voltage divider having a tap; and
multiplication of one of said first and second comparison voltages by at least one of said first and second factors is effected by said tap.

3. The circuit configuration according to claim 2, wherein:
said voltage divider has first and second taps; and
multiplication by said first factor is effected by said first tap and multiplication by said second factor is effected by said second tap.

4. The circuit configuration according to claim 3, further comprising resistors setting a divider ratio at said first and second taps of said voltage divider by being switched above said first tap.

5. The circuit configuration according to claim 1, further comprising:
a third comparison device connected to said input and to said filter and having an output at which is provided an output signal if a value of one of said first and second comparison voltages multiplied by a third factor is greater than the other one of said first and second comparison voltages, said third factor being less than said first factor and greater than said second factor; and
said control device delaying the decrease of said first and second factors and effecting the decrease only when an output signal of said second comparator is present again at a point in time of an expected subsequent commutation pulse.

6. The circuit configuration according to claim 5, wherein:
said voltage divider has first and second taps and a third tap between said first and second taps;
resistors set a divider ratio at said first and second taps of said voltage divider by being switched above said first tap; and
multiplication by said first factor is effected by said first tap, multiplication by said second factor is effected by said second tap, and multiplication by said third factor is effected by said third tap.

7. The circuit configuration according to claim 1, wherein:
said filter has a settable filter frequency; and
a filter frequency setting device is connected to said filter and sets said filter frequency dependent upon a rotational speed of a connected fan.

8. The circuit configuration according to claim 1, further comprising a clock generator connected to said regulator, said control device, and said filter and supplying said regulator, said control device, and said filter with clock signals having frequencies in a fixed ratio with respect to one another.

9. The circuit configuration according to claim 1, wherein, to identify positive commutation pulses, the input voltage is said one of said comparison voltages multiplied by said first and second factors and said other one of said comparison voltages is said filter output voltage.

10. The circuit configuration according to claim 1, wherein, to identify negative commutation pulses, said filter output voltage is said one of said comparison voltages multiplied by said first and second factors, and said other one of said comparison voltages is the input voltage.

11. The circuit configuration according to claim 9, wherein, to identify negative commutation pulses, said filter output voltage is said one of said comparison voltages multiplied by said first and second factors, and said other one of said comparison voltages is the input voltage.

12. The circuit configuration according to claim 1, further comprising a voltage divider having a tap, said voltage divider multiplying one of said first and second comparison voltages by at least one of said first and second factors with said tap.

13. The circuit configuration according to claim 12, wherein:
    said voltage divider has first and second taps; and
    said voltage divider multiplies by said first factor with said first tap and multiplies by said second factor with said second tap.

14. The circuit configuration according to claim 13, wherein:
    said voltage divider has resistors with said taps; and
    a switch is connected to said control device and selectively connects at least one of said first and second comparators to set a divider ratio of said voltage divider by switching at least one of said resistors at said first tap.

15. A circuit configuration for identifying positive and negative commutation pulses, comprising:

an input for receiving an input voltage, proportional to a current and forming a first comparison voltage;

a low-pass filter connected to said input and filtering the input voltage, said filter having an output at which a filter output voltage is tapped off as a second comparison voltage;

a first comparison device connected to said input and to said filter for commutation identification and having an output at which a signal indicates a commutation if a value of one of said first and second comparison voltages multiplied by a first factor is greater than the other one of said first and second comparison voltages;

a regulator outputting a control voltage in a manner dependent upon identified commutation pulses;

a second comparison device connected to said input and to said filter and having an output at which is provided an output signal if a value of one of said first and second comparison voltages multiplied by a second factor is greater than the other one of said first and second comparison voltages, said second factor being less than said first factor;

a control device connected to said outputs of said first and second comparison devices, said control device decreasing said first and second factors in the event of receiving said output signal of said second comparison device for reducing a sensitivity of the commutation identification;

to identify positive commutation pulses, the input voltage is said one of said comparison voltages multiplied by said first and second factors and said other one of said comparison voltages is said filter output voltage; and to identify negative commutation pulses, said filter output voltage is said one of said comparison voltages multiplied by said first and second factors, and said other one of said comparison voltages is the input voltage.

* * * * *